United States Patent [19]

Brock

[11] 4,097,227
[45] Jun. 27, 1978

[54] AIR MOVING DEVICE WITH OIL FIRED HEATING APPARATUS

[75] Inventor: James A. Brock, Sidney, Ohio

[73] Assignee: Aerovent, Inc., Piqua, Ohio

[21] Appl. No.: 695,473

[22] Filed: Jun. 14, 1976

[51] Int. Cl.$^2$ ............................................. F27B 17/00
[52] U.S. Cl. .................................... 432/187; 431/159; 431/202; 432/222; 432/500
[58] Field of Search ............... 432/222, 500, 162, 168, 432/186, 187; 431/159, 202

[56] References Cited

U.S. PATENT DOCUMENTS

| | | | |
|---|---|---|---|
| 1,863,391 | 6/1932 | Bluemel | 432/222 |
| 3,193,265 | 7/1965 | Cowan | 432/222 |
| 3,593,969 | 7/1971 | Smithson et al. | 432/222 |
| 3,664,034 | 5/1972 | Wilson | 432/500 |
| 3,932,119 | 1/1976 | Alms et al. | 432/222 |
| 4,011,041 | 6/1975 | Taylor | 432/222 |

*Primary Examiner*—John J. Camby
*Attorney, Agent, or Firm*—Jerome P. Bloom

[57] ABSTRACT

Apparatus for drying and/or curing cereal grains, tobacco and other materials, elements of which may be ingested by human beings, comprises a tube defining a flow passage in the inlet end of which is positioned a device for moving a pressured flow of air through said passage and in the outlet end of which is positioned and projected therefrom a means defining a combustion chamber. In connection with the combustion chamber are means arranged to deliver and ignite oil to produce a flame capped by and projected interiorly of the combustion chamber. The flame is enveloped in a pressured flow of air the impetus of which has its source in a blower embodied in an oil burner assembly mounted on the outer surface of the tube, which burner assembly provides for a pressured delivery of the oil. Means are provided to insure that the oil burner assembly and its blower are operating under pressure equal to or greater than the pressure of the air flow through said tube. The arrangement of the combustion housing and the flame created is such to provide for a turbulent condition in the burner housing as a result of which the products of combustion issue from the combustion chamber in an essentially clean condition. A secondary chamber is provided in the preferred embodiment illustrated, in which the products of combustion issuing from the combustion chamber may have undesirable content thereof, if any, finally broken down and vaporized before entering the pressured flow of air exiting from the tube.

In the drying or curing system illustrated the outlet end of the aforementioned tube is inserted in a wall structure forming part of a flow channel underlying the apertured floor of a drying or curing chamber. The inlet end of the tube is inserted in means defining a chamber communicated on the one hand with the atmosphere and on the other hand with the interior of the drying or curing chamber. On operation of the air moving device in said tube, the pressurized flow of air developed thereby moves through and outwardly of said tube where it entrains the total of the products of combustion of oil which has issued from said combustion chamber, to be heated thereby and to move therewith to and through the floor of the drying or curing chamber to serve its intended function. The exhaust air resulting in such chamber is selectively totally or partially exhausted to the atmosphere. In the latter case a portion is directed to intermingle with the air drawn from the atmosphere to pass through the aforementioned tube for heating as described.

24 Claims, 6 Drawing Figures

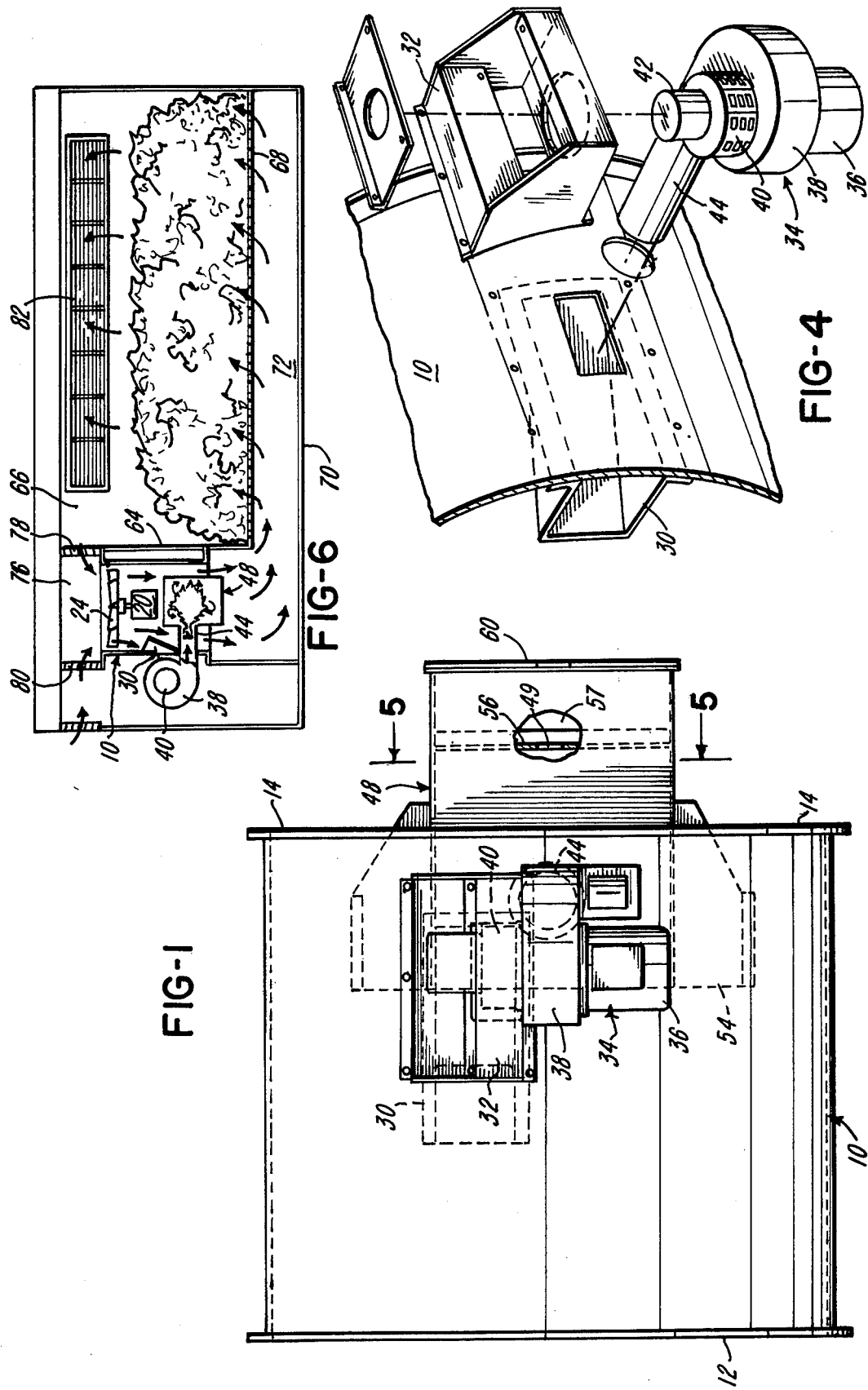

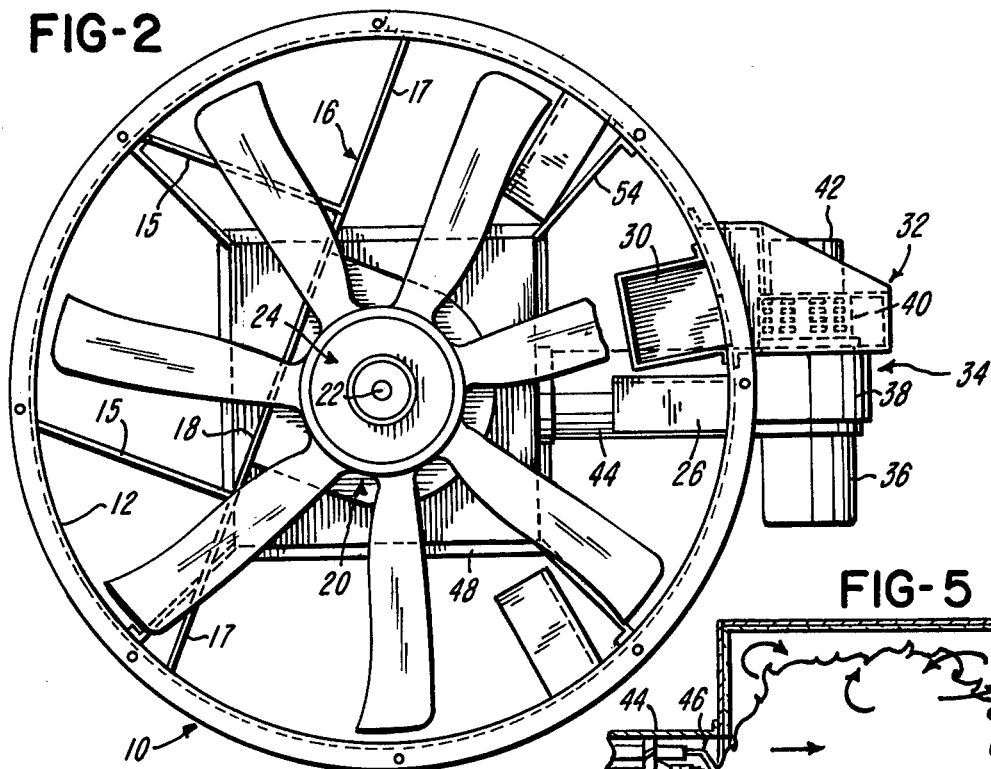

AIR MOVING DEVICE WITH OIL FIRED HEATING APPARATUS

BACKGROUND OF THE INVENTION

The present invention relates to apparatus especially advantageous in application to the drying of cereal grains and the curing of tobacco. Embodiments are basically air moving units in which means are provided to heat the air in transit. They feature means enabling a safer and more economical utilization of oil as the source of the required heat.

It has not heretofore been considered reasonably safe or practical, in drying or curing procedures, to apply the products of combustion of oil directly to such materials as grain or tobacco, elements of which are in use ingested by human beings. For this reason, when oil burning equipment has been used to ignite oil to produce heat for such purposes, it has been the practice to extract portions of the heat so produced using a heat exchange device and to use this device to heat the moving flow of air applied to the materials being dried or cured. This avoids exposure of such materials to the dangerous products of combustion of oil, which normally include unburned particles thereof. In the process, that portion of the products of combustion of the oil not transferred to the heat exchange device are exhausted into the atmosphere. This last not only results in a large loss of energy which is sometimes as much as 40 to 50% of the available energy potential of the oil but a pollution of the atmosphere. Apart from the foregoing practices, it has been found that conventional oil burning equipment cannot and does not efficiently function in the application thereof to the purposes noted. This is due to the inability of such equipment, as heretofore designed, to cope with the changing conditions of static pressure and the wide range thereof against which it must operate in the use thereof in drying grain and curing tobacco as conventionally practiced.

If the foregoing is kept in mind, the considerable advance in the art which the present invention achieves should be quite clear from the following description of a preferred embodiment.

SUMMARY OF THE INVENTION

The present invention provides an air moving device which in the embodiment illustrated includes a housing in the form of a tube defining an air flow passage in the inlet end of which is fixed a propeller type fan assembly. The tube mounts an oil burner unit including a blower assembly embodying a gun type discharge tube. The latter is projected radially inward of the tubular housing and exposes a fuel discharge head and fuel ignition means in the projected end thereof.

Means defining a combustion chamber is fixed interiorly of the tubular housing in axially spaced following relation to the propeller type fan assembly. The combustion chamber is designed to have a discharge opening in the end thereof which is remote from the fan assembly, which end is positioned beyond the outlet end of the tubular housing. The only other opening to the combustion chamber is to one side thereof and this opening is rimmed by the projected end of the gun type discharge tube of the blower assembly of the oil burner unit. By such means the fuel discharge head of the burner unit and the associated ignition means are exposed to and positioned in immediate communication with the interior of the combustion chamber. The arrangement is such that upon ignition of the oil issuing from the burner head there is a resultant flame which is caused to project interiorly of the combustion chamber under the influence of the pressured flow of air produced in the operation of the blower. The net result is that the flame and correspondingly the products of combustion are directed interiorly of one side of the combustion chamber in an entraining flow of air directed essentially at right angles to the central longitudinal axis of the tubular housing. The air and the products of combustion are thereby caused to impact on the wall of the combustion chamber opposite its inlet opening. This produces a turbulent condition of the gases introduced to, formed in and contained by said chamber. In the preferred embodiment illustrated the walls of the chamber are lined with refractory material having the characteristic of heating up in the combustion process to a level that particles of unburned oil impacted thereon are not only induced to break up but caused to vaporize. Due to the turbulence produced there is obviously repeated impact of the gases in the chamber on the refractory material which lines its walls. As a consequence, there is essentially complete combustion of the oil so that the gases issuing from the combustion chamber are clean. To insure that the issuing gases ae in an optimal form, there is provided a baffle positioned in facing and axially spaced relation to the discharge opening from the combustion chamber. This baffle provides a further inpact surface upon which any potentially remaining unburned particles of oil may be broken down and vaporized.

It will be seen that upon operation of the propeller type fan assembly the air moved thereby will pass into and through the tubular housing to envelop the combustion chamber in its path as well as the blower discharge tube and in movement of the air past the discharge outlet of the combustion chamber and clear of the tubular housing the air will contribute to an acceleration of the flow from the combustion chamber of hot gases and their impingement on the baffle and entrain the resultant product, to be heated thereby. In the manner described oil is converted to an optimally clean source of direct heat for the flowing air and all the potential energy of the energy of the oil is applied to useful purposes. The savings in the process are believed self-evident.

It is therefore a primary object of the invention to provide air moving apparatus embodying means for heating the flow of air produced thereby which is more economical to employ, more efficient and satisfactory in use, adaptable to a wide variety of application and unlikely to malfunction.

A further object is to provide means enabling the products of combustion of oil to be applied directly to a moving flow of air to heat the same and enable the direct application of essentially its total heat content to a drying or curing process.

Another object of the invention is to provide means defining an improved combustion chamber and an improved arrangement for effecting more complete combustion of oil having particular advantage when used in connection with a system for heating air used in a drying or curing process.

A further object of the invention is to provide air moving apparatus and components thereof having particular advantage for use in a drying and curing process wherein oil is used as a source of energy for heating the required air possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein one but not necessarily the only form of embodiment of the invention is illustrated, FIG. 1 is a generally diagrammatic side elevation view of an air moving unit in accordance with the present invention;

FIG. 2 is a veiw of the inlet end of the unit of FIG. 1;

FIG. 3 is a view of the outlet end thereof;

FIG. 4 is an exploded fragmentary diagrammatic showing of component detail and assembly;

FIG. 5 is a cross section taken on line 5—5 of FIG. 1;

FIG. 6 is a schematic view showing an installation of the air moving unit of the invention in a system for drying grain or curing tobacco or like applications.

Like parts are indicated by similar characters of reference throughout the several views.

In the accompanying drawings, the air moving apparatus of the invention includes a tube 10 defining a housing of uniformly cylindrical configuration having an inlet end opening 12 and an outlet end opening 14. Fixed to the inner wall of the tube 10 adjacent and spaced forwardly of the inlet opening 12 is a pair of right angled struts 16, leg portions 15 of which are positioned in spaced parallel relation and leg portions 17 of which are established in a co-planar relation. The space between adjacent ends of the leg portions 17 is bridged by a plate 18. The latter is fixed to and braced by the struts 16 at its respectively opposite sides and serves as a base for a motor 20. The drive shaft 22 of the motor 20 is positioned in the central longitudinal axis of the tube 10 and mounts a propeller type fan assembly 24 to operate in a plane transverse to and in the vicinity of the inlet opening 12. Conventional means (not shown) are provided to connect the motor 20 to a source of power. The blades of the fan assembly 24 are so shaped that upon an energization of the motor 20 they will induce a flow of air to move from the surrounding environment to and through the tube 10.

Fixed to the inner wall of the tube 10 in immediately following relation to the fan assembly 24 is a series of three guide vanes 26. The function of the vanes 26 is to induce a controlled pattern of the flow of air as it moves to and through the tube 10. In connection with the inner wall surface of the tube 10, immediately beyond the vanes 26, is a plate structure which forms with a portion of the tube 10 an air scoop 30. The expanded inlet end of the scoop 30 lies directly in the path of a peripheral portion of any air flow which moves through the tube 10. The tube 10 has an opening in its wall structure which communicates the convergent end of the scoop 30 with the interior of a housing 32 mounted on the outer surface of the tube 10. Opposite axially spaced wall segments of the housing 32 have aligned apertures through which is projected one end of an oil burner assembly 34 based on the outer surface of the tube 10. The burner assembly 34 includes, coupled in a coaxial relation, a motor section 36, a blower section 38, and air inlet section 40 for the blower and a fuel supply section 42 and the blower section 38 embodies a tangentially and laterally directed gun type discharge tube 44 which defines its outlet. The tube 44 is projected through an aperture in the wall of the tube 10 and radially inward thereof, a seal being conventionally provided therebetween. The tube 44 houses a fuel delivery line leading from the fuel supply section 42, the latter of which is arranged to be connected to a source of oil under pressure. Thisfuel delivery line terminates at the projected extremity of the tube 44 in a burner head 45 adjacent to which is positioned a suitable ignition means 46.

Attention is strictly directed to the fact that only a limited portion of the burner assembly 34 is positioned within the housing 32. This is the air inlet section of the blower portion of the burner assembly.

The burner assembly illustrated is a conventional unit per se of a type such as a current model 92 ABC oil burner. Since the construction of such a burner per se is well known the details thereof are neither specifically illustrated nor described except to the extent necessary for understanding the improvements of the present invention. As is readily known and understood by those versed in the art, in the operation of this known burner assembly the gun type discharge tube of the blower embodied therein not only houses the fuel delivery line with its connected burner head and associated ignition means but serves as a tube for discharging a flow of air under pressure in enveloping entraining relation to the flame produced by ignition of oil on the delivery thereof to and the discharge thereof from the burner head.

The end of the gun type discharge tube 44 which is projected radially inward of the tube 10 nests in a collar like adapter rimming a single aperture in the side wall 47 of a rectangular housing 48 defining a combustion chamber 50. A suitable seal is provided between the tube 44 and the side wall of the housing 48. The inner wall surface of the housing 48 is lined with a suitable refractory material 52. The housing 48 is in the case illustrated a rectangular box-like hollow structure which is supported in centered relation to the discharge end portion of the tube 10 by strut-like plates 54 connected to project radially from the corner edges of the housing and to have their radially projected extremities fixed to the inner wall surface of the tube 10. The housing 48 has a single discharge opening in the end thereof remote from the inlet opening 12.

As may be seen from the drawings, the housing 48 is coaxial with and in end spaced relation to the propeller type fan assembly 24 and its axial length is such to have a portion thereof project through and beyond the outlet opening of the tube 10. This positions the discharge opening 49 of the housing 48 in a plane spaced outwardly of that defined by the discharge end of the tube 10. The peripheral walls of the housing 48 are axially extended beyond its end wall portion 56 which includes the outlet from the chamber 50 to mount a baffle plate 60 in bridging relation to the rectangular opening 59 defined by their axial projected edges, which lie in a common plane. The plate 60 has a generally rectangular configuration but it is dimensioned to be smaller than the opening 59. It is centered in this opening by brackets 61. As seen in the drawings, this arrangement is such to leave, beyond the end wall 56 of the housing 48 a discharge chamber 57 capped by the baffle plate 60 to leave, about the periphery of the baffle plate, an exit passage 62 through which the gases discharged from the combustion chamber 50 may escape past the baffle plate after impact thereon, at a location beyond the outlet end opening 14 of the tube 10.

As is self evident from the drawings, the cross sectional dimension of the housing 48 is such that the tube 10 defines about the housing 48 a substantial generally annular passage for air moving through and axially of the tube 10 to pass the housing 48 in an enveloping flow.

It is of particular consequence, in accordance with the invention, to note that the air scoop 30 is utilized to direct a portion of the pressured flow of air moving through the tube 10 to the interior of the external housing 32 for the air inlet section 40 of the blower embodied in the burner assembly 34. This contributes to an equalization of the pressure as between the air pressure under which the oil burner assembly operates and the pressure associated with the drying or curing process to which the air moving apparatus of the invention is applied. The effect of this forced air movement into the area surrounding the air inlet of the blower assembly is accordingly such to increase the level of pressure under which the burner assembly may operate and this enables the blower to better operate against the static pressures developed in the combustion chamber 50. Not only this, the air scoop can help to assure a positive pressure differential between that of the air delivered by the blower and that in the combustion chamber. The net result of the construction provided is that as static or back pressure increase on the air moving apparatus of the invention, as applied to a drying or curing process, the operation of the oil burner is not impaired since it "sees" identical air pressures at the inlet and the outlet of the burner assembly.

FIG. 6 of the drawings illustrates, schematically, an application of the air moving apparatus of the invention in a drying or curing process. As seen in FIG. 6, the tube 10 is mounted immediately adjacent a side wall 64 of a drying chamber 66 which is formed within a curing shed. The chamber 66 has a floor 68 which is in spaced elevated relation to the base 70 of the shed and defines therewith a chamber 72, laterally extended by suitable wall structure to underlie the lower or outlet end of the tube 10. The outlet end of the tube 10 is nested in and in rimming relation to an opening in a laterally extended top wall portion of the chamber 72, a seal being provided therebetween. With the air moving apparatus disposed as described, the housing 48 will have the discharge end thereof projected interiorly of the chamber 72. The latter is fully sealed except for outlet openings provided by a plurality of small apertures 74 in the bottom floor 68 of the chamber 66.

The inlet end opening 12 of the tube 10, shown in FIG. 6 to be uppermost, opens to a chamber 76 thereabove, one side wall portion of which is provided by an upper portion of the side wall 64 of the chamber 66. This side wall portion common to the chambers 66 and 76 has an aperture bridged by a unit 78 including adjustable louvers which may be conventionally operated to provide, selectively, communication between the chambers 66 and 76. An opposite side wall of the chamber 76 has an aperture similarly bridged by a louvered structure 80 which is similarly operable to provide for selective inflow to the chamber 76 of air from the environment of the shed, suitable air passage being provided in the adjacent wall thereof the nature of which would be as needs require to suit the application.

Further provided in another wall of the chamber 66 is a louvered exhaust opening 82. It will be seen therefore that the chamber 66 is provided with inlet apertures 74, an exhaust opening 82 which may be variably limited and a louvered outlet 78 communicating with the inlet opening 12 of the tube 10 to the degree determined by the setting of its louvered structure.

In the operation of the system shown in FIG. 6, with the louvered structure 78 closed for example, the motor 20 may be energized to drive the propeller type fan assembly 24 and thereby induce the inflow of air to the chamber 76 to the degree determined by the setting of the louvered structure 80 and this air will be forced to and through the tube 10, in enveloping relation to the housing 48 defining the combustion chamber 50 and, in the process, over the tube 44 defining the discharge outlet of the blower of the burner assembly 34. The burner assembly will of course be provided with means for suitable energization thereof and the same will be operated to pump oil to and from the burner head 45 to be ignited by the ignition means 46 and produce a flame. At the same time the air is being forced through the tube 10 under the influence of the fan assembly 24 a portion of this air will be picked up and channelled by the scoop 30 to the interior of the housing 32 to place the air furnished the blower of the burner assembly under the same or under a greater pressure than exists in the tube 10. As mentioned previously, this insures operation of the burner assembly properly in the face of changing static pressure that may be developed downstream of the air moving unit by the materials being dried or cured in the chamber 66. Of course, upon ignition of the fuel discharge from the burner head 45 the flame produced thereby will be enveloped in the air delivered by the blower through the tube 44 and projected interiorly of the combustion chamber the walls of which are lined with refractory material. As the flame and the products of combustion of the oil are projected interiorly of the combustion chamber 50 under the influence of the high pressured flow of air from the blower in the burner assembly the products of combustion and any unburned particles of the oil contained therein will be impacted upon the refractory material lining the combustion chamber. This refractory material may be of any well known type the nature of which is such that it will respond to combustion with an achievement of an elevated temperature the level of which may be maintained in correspondence with that of the flame so that simultaneously as particles of unburned oil may be impacted thereon such particles will not only be broken down but caused to vaporize. By reason of the fact that the combustion chamber 50 is relatively small and the high pressured flow of air from the blower of the burner assembly there will be induced interiorly of the chamber 50 a highly turbulent condition of the contained gas. This insures repeated impacting of any unburned particles of oil and a maximizing of effective combustion. Due to the pressure level under which the blower of the burner assembly operates there will be continuous discharge of the resultant products of combustion in a gaseous form from the outlet of the combustion chamber 50. In exiting from the chamber 50 under pressure the issuing gases impact on the baffle 60 to insure further breakdown and vaporization of contained particles, if any, providing thereby that as the gases escape they are in an essentially clean condition.

Viewing FIG. 6, due to the projection and extension of the housing 48 from the outlet end of the tube 10, the air flow exiting from the tube 10 will move about and envelop the projected end of the housing 48 and its extension to entrain from the apertures about the baffle plate 60 the resultant gases which have evolved from the clean combustion of the oil. These hot clean gases will be embodied, accordingly, in a pressured flow of air which is maintained under the influence of the fan assembly 24 in the interior of the chamber 72. As will be seen, the total heat potential of the oil will thus be embodied in the air flow which will move in jet-like streams to the interior of the chamber 66 in which the material to be dried or cured is hung or supported in elevated relation to the floor 68. The outlet 82 from the chamber 66 will be suitably controlled to maintain this desired condition within the chamber 66. If desired, the louvered structure 78 may be selectively adjusted to provide for a measured amount of the air in the chamber 66 to be recirculated to the chamber 76 to intermingle with the incoming fresh air from the environment surrounding the shed 62.

From the foregoing description of a preferred embodiment of the invention and an application thereof to a process of drying or curing cereal grains or tobacco or like material, it should be seen that a very unique apparatus and system is enabled by the present invention. Not only does the invention enable a direct application of the potential energy of oil to a drying or curing process in a safe and sure manner but the invention also provides means for effecting a conversion of oil to clean gases, utilizing a basic conventional oil burner assembly. As noted, it is of considerable importance that the improvements of the invention enable the conventional burner assembly to operate under pressure conditions which enable its application for the purpose intended and similar applications in which the conventional burner assemblies have not heretofore been able to operate with desired efficiency.

Particular note must be taken of the fact that the combustion chamber of the invention is not only especially constructed and arranged but its outlet is so limited that there is a restrictive exit and this dictates that with the turbulent condition within the combustion chamber unburned oil or smoke particles that may be in the hot gas stream resulting upon ignition of the oil must of necessity pass through the intense heat of the flame which is projected interiorly of the combustion chamber several times before exiting from the combustion chamber. This of course helps to guarantee the cleanliness of the gases which pass from the combustion chamber. Moreover, after the gases pass from the combustion chamber, they will impinge on the baffle 60 which in the preferred embodiment of the invention will be a metal plate which during the operation of the invention unit becomes extremely hot. The function of the plate 60, as previously described, will therefore be optimal. The impact plate 60 further functions to spread the hot gases to evenly distribute them in their escape to the air stream.

In summary, the products of combustion are passed from the invention unit in a safe condition and all of the heat generated in the combustion process is utilized. Efficiency is improved in the drying and curing process by as much as 50%, greatly reducing the overall cost of this process. Any requirement for a heat exchanger is eliminated as well as the heretofore required continuous adjustment of an oil burner assembly when applied to similar purposes.

It is noted that such controls as may be necessary to be provided for the operation of the invention embodiment illustrated are of a conventional nature. Accordingly the details thereof are neither shown nor described, particularly since they are not essential to an understanding of the improvements of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for drying and/or curing cereal grains, tobacco and other materials elements of which may be ingested by human beings comprising, a housing having an inlet thereto, an outlet therefrom and means forming a passage connecting said inlet with said outlet, a device operable to produce and move a pressured flow of air through and from said passage by way of said outlet, means defining a combustion chamber positioned within said passage in the path of said pressured flow of air in its movement to and through said outlet, means arranged to deliver and ignite a combustible mixture of air and oil under pressure to produce a flame which is capped by and projects interiorly of said means defining said combustion chamber, said means defining said combustion chamber including an exit for products of combustion in the form of a relatively restricted outlet from said combustion chamber, said means to deliver the combustible mixture of air and oil to said combustion chamber being arranged to deliver said mixture into said chamber in a manner to impact unconsumed oil particles thereof on an interior wall surface of said chamber to facilitate their vaporization, said restricted outlet and the manner of delivery of said combustible mixture promoting turbulence in said combustion chamber leading to a thorough burning therein of combustible materials, and means arranged to provide a surface on which the products of combustion which exit from said restricted outlet impact prior to such products joining the pressured flow of air moving from said housing by way of said outlet.

2. Apparatus as in claim 1 characterized by refractory material on the inner wall surface of said means defining said combustion chamber, said refractory material serving by the temperature thereof in the function of said combustion chamber, to vaporize unconsumed elements of oil which impact thereon.

3. Apparatus as in claim 1 wherein a tube structure houses the terminal portion of said air and oil delivery and ignition means, one end of said tube being in connection with a blower forming part of an oil burner assembly mounted on the outer surface of said housing and the other end of said tube projecting interiorly of said housing to connect to and rim an inlet to said combustion chamber, and said terminal portion of said air and oil delivery and ignition means being located in said other end of said tube in direct communication with the interior of said combustion chamber.

4. Apparatus as set forth in claim 1 characterized in that said means defining a combustion chamber includes in connection therewith means defining an extension thereof forming a second chamber the wall at one end of which includes said restricted outlet and the wall at the opposite end of which includes means for passage therefrom of the products of combustion discharged from said combustion chamber and provides said impact surface against which products of combustion which exit from said restricted outlet may impact to reduce and vaporize their undesirable content, if any, to provide that said products of combustion issue from said second chamber in a clean, hot, gaseous form.

5. Apparatus as in claim 4 characterized in that said wall at said opposite end of said second chamber is provided by a baffle plate immediately adjacent and spaced from said restricted outlet at peripheral portions of which are defined a plurality of exit passages from said second chamber.

6. Apparatus as in claim 1 characterized in that said means defining said combustion chamber is positioned centrally of said passage at said outlet therefrom.

7. Apparatus as in claim 1 characterized in that said means defining said combustion chamber has an exit end projecting through and beyond the said outlet from said housing and said exit end embodies said restricted outlet and said means providing said surface on which the products of combustion exiting by way of said restricted outlet may impact.

8. Apparatus as in claim 1 embodied in a curing or drying system including means defining a curing or drying chamber, wall means defining a channel through which heated air is transmitted to said curing or drying chamber, the outlet end of said housing being secured in an opening in said wall means, with a seal being provided therebetween and said drying and curing chamber having means for a controlled exhaust of the air delivered thereto after the same serves its function.

9. Apparatus as in claim 8 characterized in that means are provided for directing a portion of the air exhausted from said drying or curing chamber to said inlet to said housing flow passage.

10. Apparatus as in claim 8 characterized in that said channel is extended to lie below the floor of said drying or curing chamber and said floor is provided with a multitude of apertures for passage of heated air to said drying and/or curing chamber and means in connection with the inlet end of said housing is commonly communicated with the atmosphere and the interior of said drying and/or curing shed to provide for a selective mixture of exhaust from said drying or curing shed with air induced by said air moving device to move to and through said housing flow passage.

11. Apparatus for drying and/or curing cereal grains, tobacco and other materials elements of which may be ingested by human beings comprising, a housing having an inlet thereto, an outlet therefrom and means forming a passage connecting said inlet with said outlet, a device operable to produce and move a pressured flow of air through and from said passage by way of said outlet, means defining a combustion chamber positioned within said passage in the path of said pressured flow of air in its movement to and through said outlet, means arranged to deliver a combustible mixture of air and oil under pressure and to ignite said mixture to produce a flame which is capped by and projects interiorly of said means defining said combustion chamber including an oil burner assembly having a blower mounted on the outer surface of said housing, said oil burner assembly including means for directing oil through delivery means the terminal portion of which is located in communication with said combustion chamber, means facing the flow of air through said passage to directly receive therein a portion thereof and communicate the same with said blower, said blower having in connection therewith means to deliver therefrom a pressured flow of air to intermingle with the delivered fuel and provide said combustible mixture in said combustion chamber, the arrangement providing that said burner assembly is operated under essentially the same pressure conditions as exist in said housing flow passage, said air and oil delivery means being arranged to deliver the air and oil to said combustion chamber in a manner to provide on ignition thereof that unconsumed oil particles will impact on the inner wall surface of said chamber to facilitate vaporization thereof and said combustion chamber including means for exit of products of combustion therefrom by way of a relatively restricted outlet, said restricted outlet and the manner of delivery of said combustible mixture promoting turbulence in said combustion chamber leading to a thorough burning therein of contained combustible materials.

12. Apparatus for drying and/or curing cereal grains, tobacco and other materials elements of which may be ingested by human beings comprising, a housing having an inlet thereto, an outlet therefrom and means forming a passage connecting said inlet with said outlet, a device operable to produce and move a pressured flow of air through and from said passage by way of said outlet, means defining a combustion chamber positioned within said passage in the path of said pressured flow of air in the course of its movement to and through said outlet, means arranged to deliver and ignite a combustible mixture of air and oil under pressure to produce a flame which is capped and projects interiorly of said means defining said combustion chamber, said delivery and ignition means comprising an oil burner assembly including a blower mounted on the outer surface of said housing, said oil burner assembly including means for directing oil through said delivery means the terminal portion of which is located in communication with said combustion chamber and adjacent ignition means, said oil burner assembly further including an air inlet section for said blower and means defining an enclosure for said air inlet section, an air scoop being provided in said housing flow passage in communication with said air inlet section of said blower to direct air from said passage to said enclosure and provide thereby for said burner assembly to operate under essentially the same pressure conditions as those which exist in said housing flow passage, said means to deliver and ignite said combustible mixture so directing said mixture into said combustion chamber as to cause unconsumed oil particles of the mixture to impact on an inner wall surface of said means defining said combustion chamber to facilitate vaporization thereof, said combustion chamber having a restricted outlet and said restricted outlet and the manner of delivery of said combustible mixture promoting turbulence in said combustion chamber leading to a thorough burning therein of combustible materials.

13. Apparatus for drying and/or curing cereal grains, tobacco and other materials elements of which may be ingested by human beings comprising, a housing having an inlet thereto, an outlet therefrom and means forming a passage connecting said inlet with said outlet, a device operable to produce and move a pressured flow of air through and from said passage by way of said outlet, means defining a combustion chamber positioned within said passage in the path of said pressured flow of air in its movement to and through said outlet, means arranged to deliver a combustible mixture of air and oil under pressure and ignite the same to produce a flame, which flame is capped by and projects interiorly of said means defining said combustion chamber, said combustion chamber having a relatively restricted outlet for eventual exit of products of combustion therefrom for movement to and with said pressured flow of air to have essentially the total thereof utilized in the drying and/or curing of the materials to which said apparatus is applied, and said means to deliver and ignite a combustible mixture of air and oil being arranged to introduce said mixture into said combustion chamber approximately at right angles to the direction of movement of products of combustion in exiting from said restricted outlet in a manner to impact unconsumed oil particles on the inner wall surface of said chamber to facilitate vaporization thereof, said restricted outlet and the manner of delivery of said combustible mixture promoting turbulence in said combustion chamber leading to a thorough burning therein of combustible materials.

14. Apparatus according to claim 13, characterized by said means defining said combustion chamber including a housing interiorly of the first said housing providing a wall orienting substantially transversely of the means defining said passage, said wall embodying said restricted outlet.

15. Apparatus according to claim 14, said inner housing being extended beyond said wall, and baffle means positioned by said housing beyond said wall to be substantially in line with said restricted outlet to have materials discharging from said restricted outlet impact thereon.

16. Apparatus for flowing heated air in direct contact with cereal grains, tobacco and like material for drying or curing thereof, including means for generating and directing a forced flow of air, said means operating against a static pressure varying with the restriction to flow imposed by said materials, means for heating the flowing air including means defining a combustion chamber positioned in said forced air flow and providing an outlet from said chamber through which products of combustion escape to join said forced air flow against the resistance of said static pressure, means for pressurizing said combustion chamber using air supplied thereto for combustion, and means for varying the pressurization of said chamber in correspondence with variations in the static pressure.

17. Apparatus according to claim 16, wherein means are provided for supplying a combustible mixture of air and fuel to said combustion chamber, said means for supplying air including a blower, said blower being supplied with air from said forced air flow.

18. Apparatus according to claim 17, said means for generating and directing a forced flow of air including a tubular housing open at its opposite ends for a free flow of air therethrough, said means for heating the flowing air including an inner housing positioning within said tubular housing and defining said combustion chamber, said means provided for supplying a combustible mixture including a burner assembly external to said tubular housing and an enclosure for said burner assembly communicating through a window in a wall of said tubular housing with the interior thereof, said blower drawing air from within said enclosure.

19. Apparatus according to claim 18, wherein means defining a scoop projecting into said tubular housing captures air from said forced air flow and directs it into said enclosure.

20. Apparatus according to claim 18, said means for heating the flowing air including a housing defining said combustion chamber, there being a restricted exit from said housing defining the outlet from said chamber, and said means for supplying a combustible mixture to said combustion chamber including means for introducing said mixture into said combustion chamber as defined by said housing in a manner to promote in conjunction with said restricted exit turbulent action in said chamber bringing fuel particles into impacting contact with interior wall surfaces of said chamber.

21. Apparatus according to claim 20, said housing orienting longitudinally of the forced air flow and having adjacent one end thereof an end wall in which is an aperture defining said restricted exit, walls of said housing being extended beyond said end wall and mounting in substantially aligned longitudinally spaced relation to said aperture a baffle means against which materials discharging from said combustion chamber through said aperture impact.

22. Apparatus according to claim 16, said means for pressurizing said combustion chamber including means for introducing a mixture of air and fuel under pressure into said chamber, said outlet from said chamber being relatively restricted.

23. Apparatus according to claim 16, said means for heating the flowing air further including means arranged to deliver a combustible mixture of air and fuel under pressure to said combustion chamber and to ignite said mixture, and said means defining said combustion chamber including means forming an enclosure having a side wall and opposing end walls, said means to deliver said combustible mixture extending from outside said enclosure laterally through the side wall thereof and delivering said mixture into said chamber in a manner to impact unconsumed oil particles on an interior wall surface and facilitate vaporization thereof, an end wall of said enclosure having an opening therein defining a relatively restricted outlet from said combustion chamber.

24. Apparatus according to Claim 23, wherein the generated forced flow of air is directed through a housing, said means defining a combustion chamber positioning in said housing, said means to deliver a combustible mixture including air blowing and fuel supply portions comprised in a burner assembly positioning outside said housing and including an air and fuel conducting tube extending laterally through said housing and through the said side wall of said enclosure into said combustion chamber, said housing having a window opening therein through which said air blowing portion of said burner assembly draws pressured air from said forced flow of air for delivery to said combustion chamber through said tube.

* * * * *